Dec. 1, 1936.  L. S. MILLER ET AL  2,062,523
AUTOMATIC GEAR SHIFT
Filed Jan. 3, 1934  6 Sheets-Sheet 1
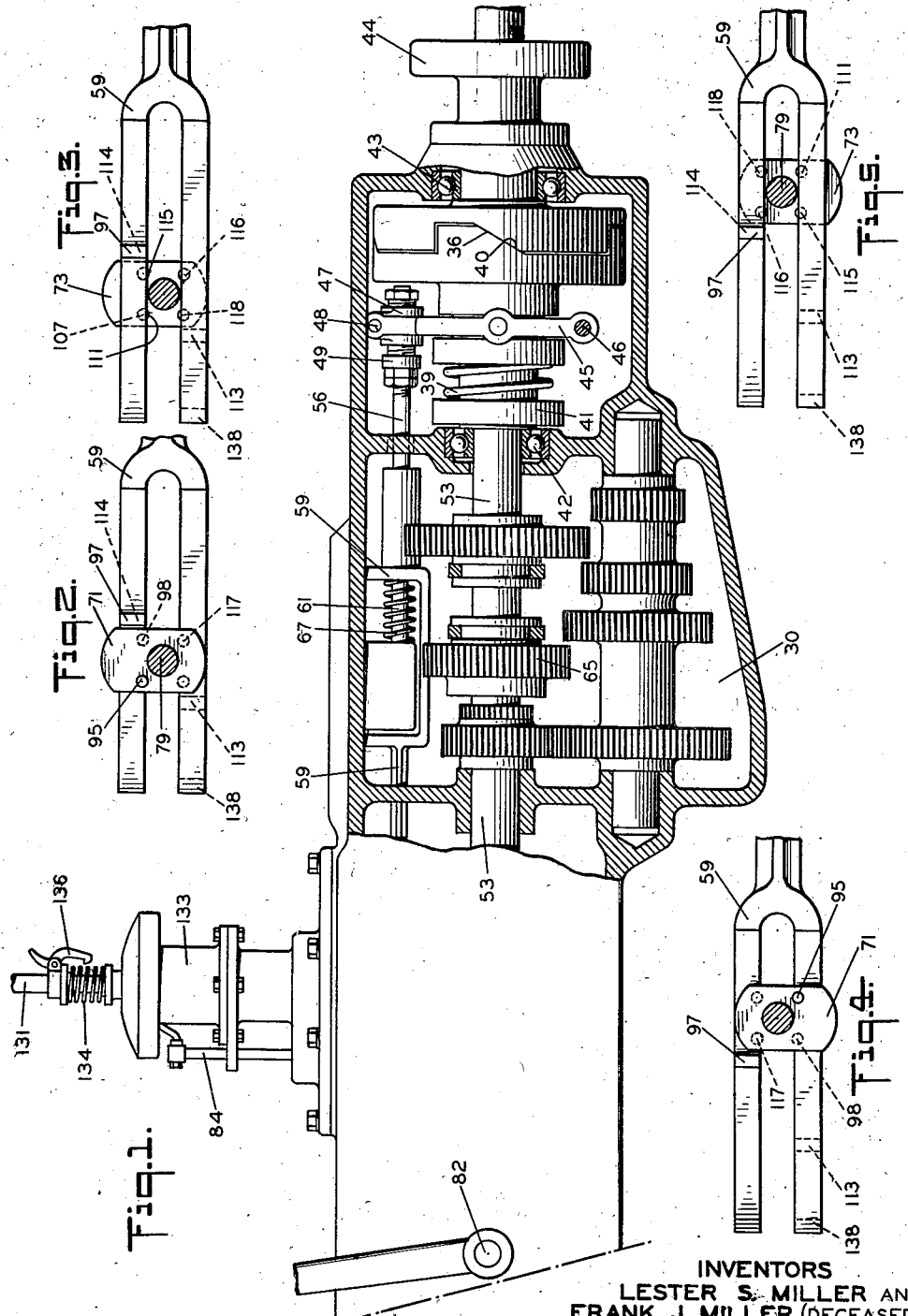
INVENTORS
LESTER S. MILLER AND
FRANK J. MILLER (DECEASED)
BY LESTER S. MILLER, ADMINISTRATOR
BY THEIR ATTORNEYS
*Howson and Howson*

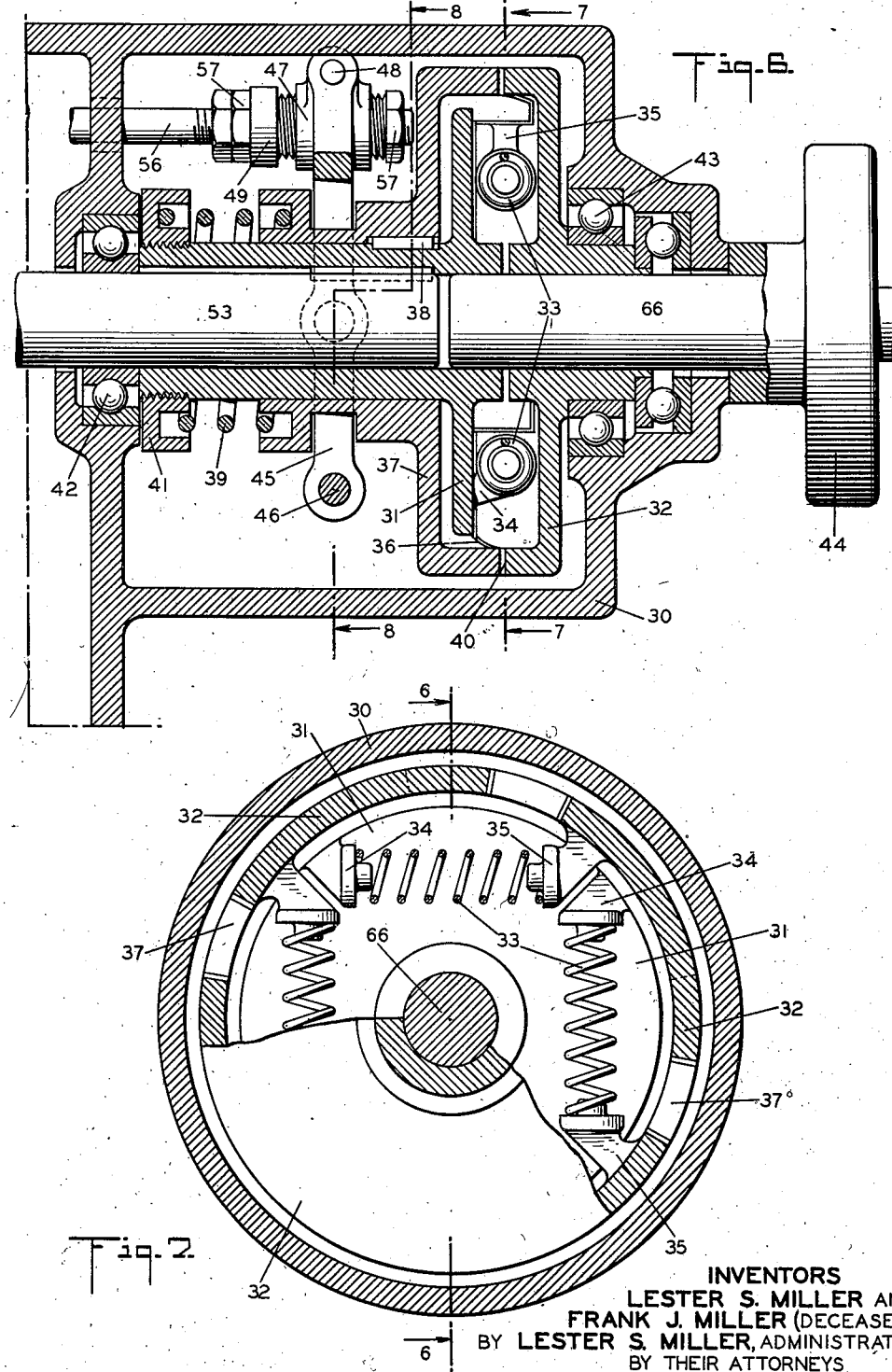

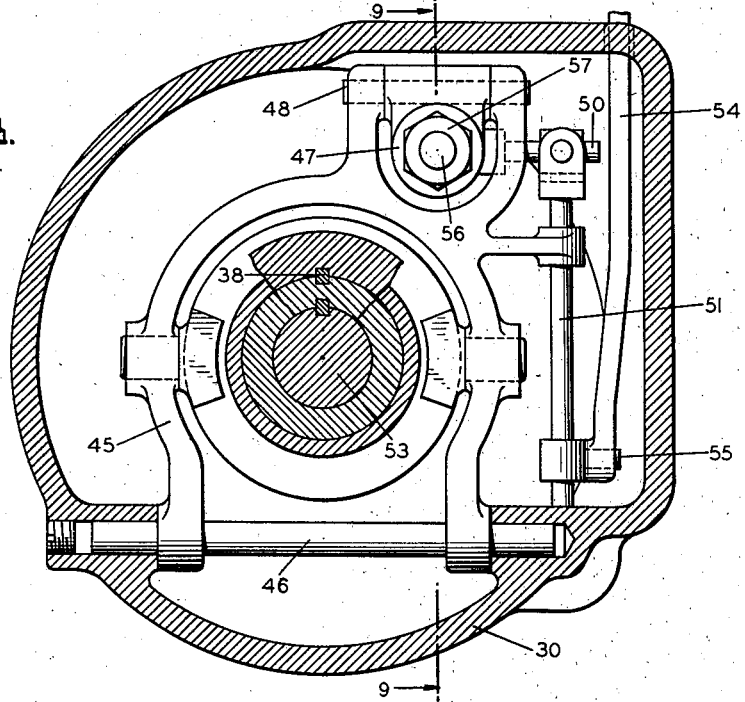
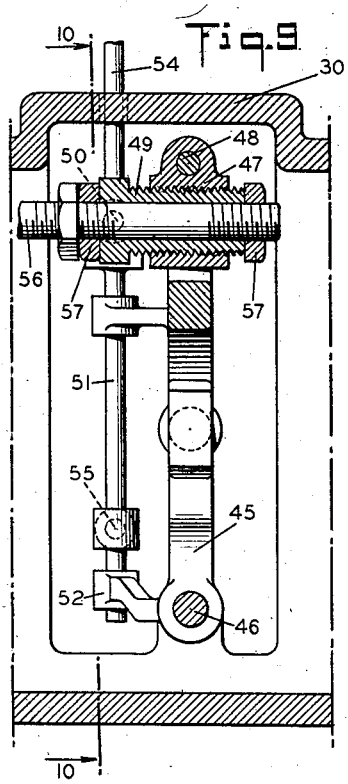
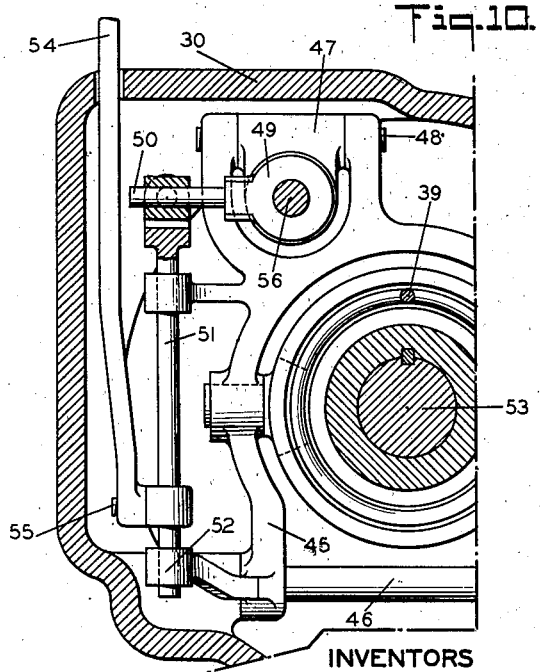

INVENTORS
LESTER S. MILLER AND
FRANK J. MILLER (DECEASED)
BY LESTER S. MILLER, ADMINISTRATOR
BY THEIR ATTORNEYS
Howson and Howson Dec. 1, 1936.          L. S. MILLER ET AL          2,062,523
                       AUTOMATIC GEAR SHIFT
                       Filed Jan. 3, 1934         6 Sheets-Sheet 5
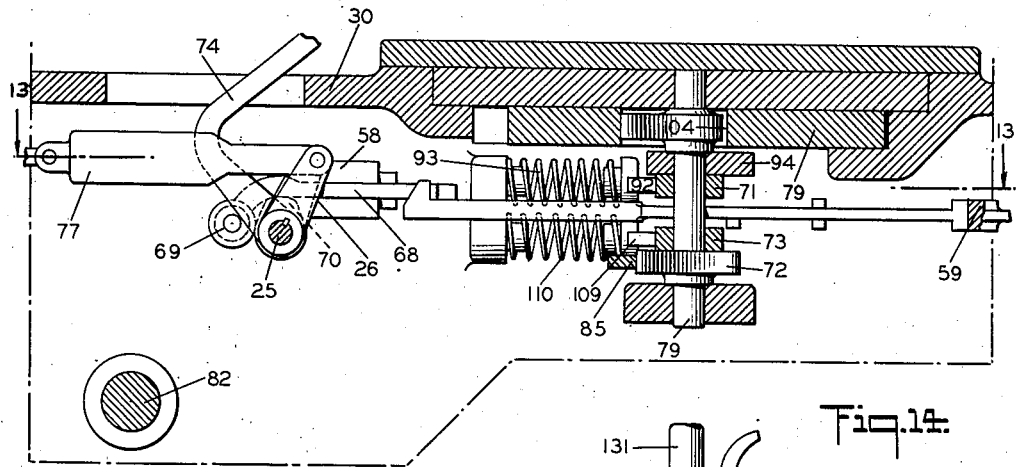
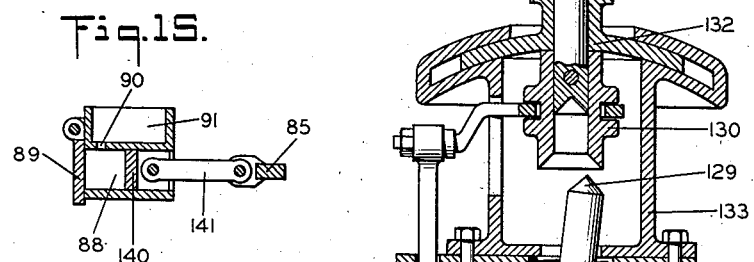
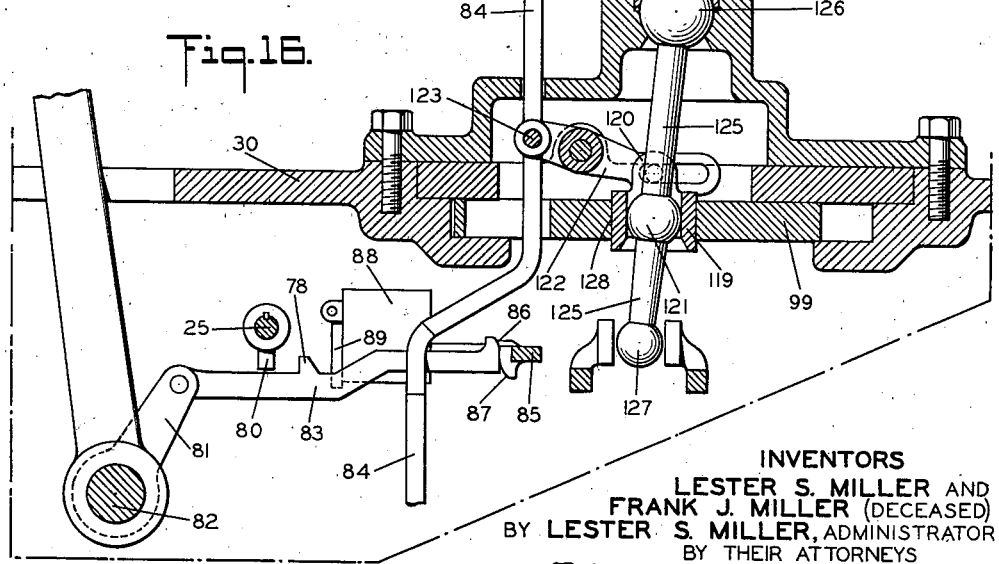
INVENTORS
LESTER S. MILLER AND
FRANK J. MILLER (DECEASED)
BY LESTER S. MILLER, ADMINISTRATOR
BY THEIR ATTORNEYS
Howson and Howson Dec. 1, 1936.  L. S. MILLER ET AL  2,062,523
AUTOMATIC GEAR SHIFT
Filed Jan. 3, 1934  6 Sheets-Sheet 6
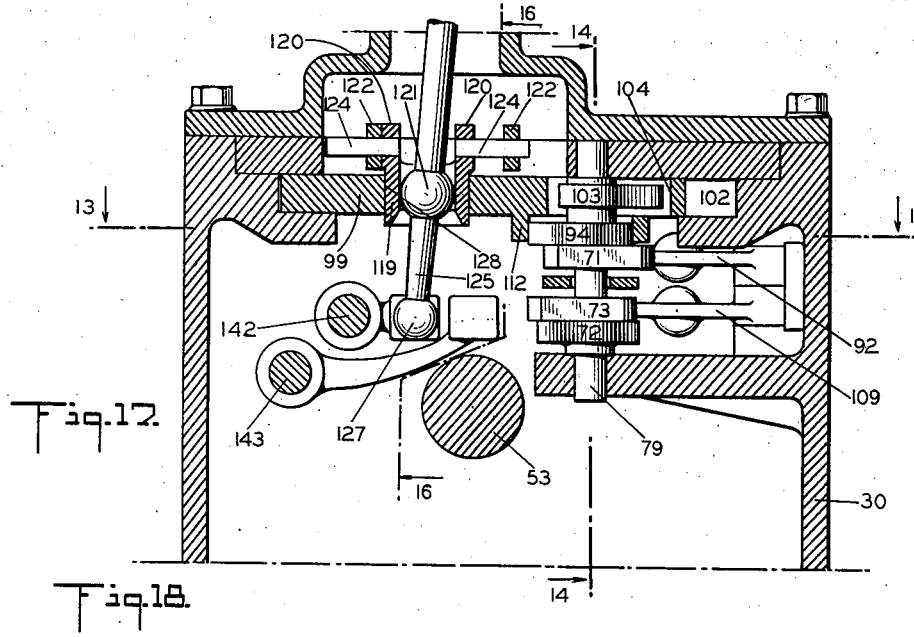
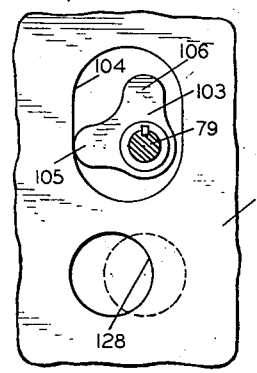
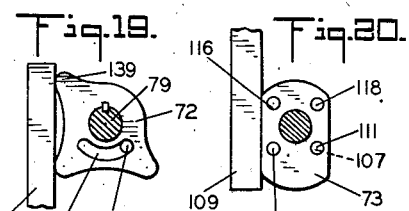
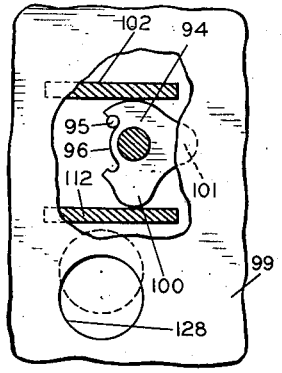
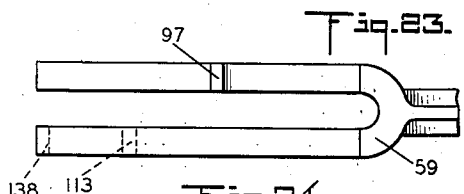
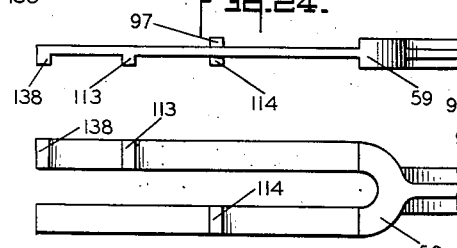
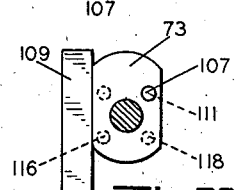
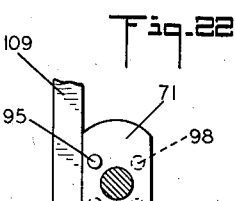
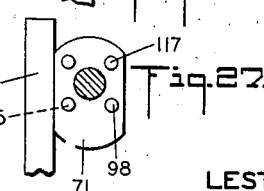
INVENTORS
LESTER S. MILLER AND
FRANK J. MILLER (DECEASED)
BY LESTER S. MILLER, ADMINISTRATOR
BY THEIR ATTORNEYS
Howson and Howson Patented Dec. 1, 1936

2,062,523

UNITED STATES PATENT OFFICE 2,062,523

AUTOMATIC GEAR SHIFT

Lester S. Miller, Verona, N. J., and Frank J. Miller, deceased, late of Verona, N. J., by Lester S. Miller, administrator, Verona, N. J.

Application January 3, 1934, Serial No. 705,142

25 Claims. (Cl. 192—.01)

This invention relates to automatic gear shifts and more particularly to devices of this character adapted for use in automotive vehicles driven by internal combustion engines.

The main object of this invention is to provide an automatic gear shift which is simple and inexpensive in construction, and convenient, smooth and reliable in operation.

Further objects are to provide an automatic gear shift for changing the transmission gear ratio in response to torque, to operate the clutch and throttle automatically as required for gear shifting operations, to adjust the timing of the shifting to the engine power, to provide constant forces for shifting the gears, to prevent operation in response to momentary torque impulses, to cushion the various movements, to adapt the device for free wheeling and manual operation, and to otherwise render the device more suitable for the purposes set forth.

Other objects will become apparent as the following description proceeds, reference being had to the accompanying drawings, in which—

Figure 1 is a side elevation assembly, partly in section, of a transmission gear box to which the automatic gear shift according to the present invention has been applied;

Figures 2 and 3 are plan views of the gear shifting fork, associated with an upper cam and a lower cam respectively, in the positions which they occupy while the vehicle is in second gear;

Figures 4 and 5 are similar views but positioned for low gear;

Figure 6 is a vertical axial section taken along line 6—6 of Figure 7, showing the primary actuator cam;

Figure 7 is a radial section taken along the line 7—7 of Figure 6;

Figure 8 is a vertical cross-section taken along the line 8—8 of Figure 6;

Figure 9 is a longitudinal section taken along the line 9—9 of Figure 8;

Figure 10 is a transverse section taken along the line 10—10 of Figure 9;

Figure 14 is a section taken along the line 14—14 of Figures 13 and 17;

Figure 15 is a detail section taken along the line 15—15 of Figure 13;

Figure 16 is a section taken along the line 16—16 of Figures 13 and 17, but including structure thereabove;

Figure 17 is a cross-section taken along the line 17—17 of Figure 13;

Figure 18 is a plan of a portion of the shifter plate, showing the lateral shifter cam therein;

Figure 19 is a plan of the clutch operating cam;

Figure 20 is a plan of the trip cam for the forward and backward shift movement;

Figure 21 is an end view of the same;

Figure 22 is a plan of the shifter plate, partly broken away to show the longitudinal shifter cam therebetween;

Figure 23 is a plan of the timer fork of the thrust rod;

Figure 24 is an elevation of the same;

Figure 25 is an inverted plan of the same;

Figure 26 is an inverted plan of Fig. 20;

Figure 27 is a plan of the trip for lateral shifting; and

Figure 28 is an inverted plan of Figure 27.

Figure 11:
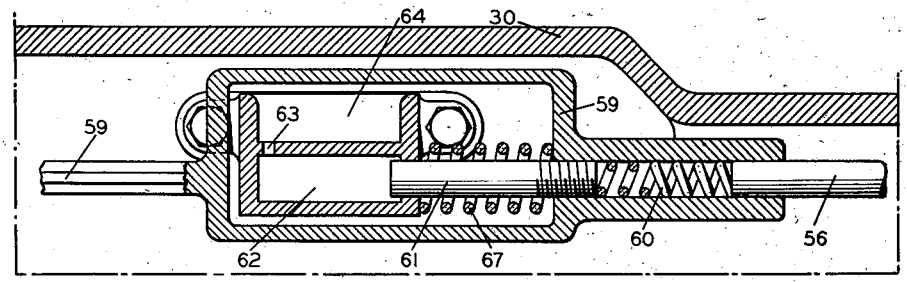
Figure 11 is a section taken along the line 11—11 of Figure 12.

The automatic gear shift according to the present invention is adapted for use with a transmission gear box 30 as shown in Figure 1. Power is suppled by an internal combustion engine, through a service clutch.

As shown in Figure 6, the power from the clutch drives a disk 31, by means of a shaft 53 suitably journalled in anti-friction bearings 42 in the gear casing 30. The disk 31 drives a flanged collar 32, through compression springs 33. The collar 32 is keyed to a shaft 66, and journalled in suitable anti-friction bearings 43. This shaft, through the usual universal joint 44, drives the propeller shaft which transmits the power to the driving axles or other traction device.

Referring to Figure 7, the springs 33 are mounted between lugs 34 on the disk 31 and lugs 35 on the collar 32. A complementary collar 37 is splined or keyed as at 38 on the hub of the disk. The flange thereof is notched to provide inclines 36 engaging inclines 40 in the flange of collar 32. A spring 39 on the hub of disk 31 is interposed between a collar 41 on this hub, and the hub of collar 37.

As shown in Figures 8, 9, and 10 a yoke 45 extends down over the shaft 53 and is pivoted on a cross rod 46 extending transversely therebelow. The upper end of this yoke carries a nut 47 pivoted on a pin 48. A hollow screw 49 in the nut 47 receives the rear end of a thrust rod 56, retained therein by nuts 57.

The screw 49 has an arm 50 slidably and pivotally connected to the upper end of a rod 51, which is slidable in guides 52 carried by the yoke 45. An operating rod 54 is pivoted to the rod 51 by a pivot 55, and extends upward through an aperture in the gear casing, to within reach of the operator.

Figure 12:
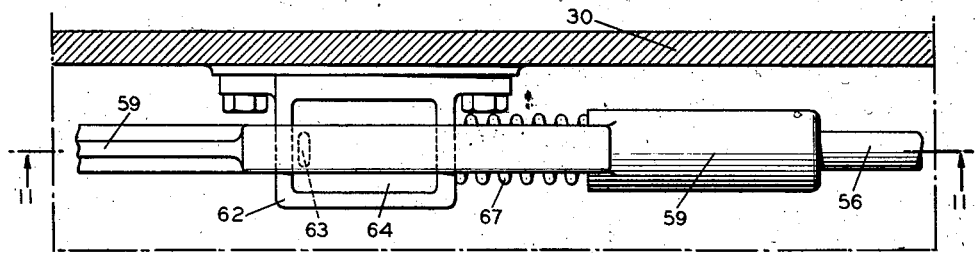
Figure 12 is a plan of the shock absorber in the thrust rod.

As shown in Figures 11 and 12, the front end of the rod 56 slides in a bore in the rear end of the timer thrust rod 59, in which it is cushioned by a compression spring 60, which bears on a short shaft 61 threaded in the front end of the bore. The front end of shaft 61 in turn enters an oil chamber 62 secured to the wall of the gear casing 30. The chamber 62 is connected by a bleed orifice 63 to an overflow pan 64. The rod 59 has a yoke around the oil chamber 62, and a spring 67 on the rod 61 within this yoke and bears against the chamber 62.

Figure 13:
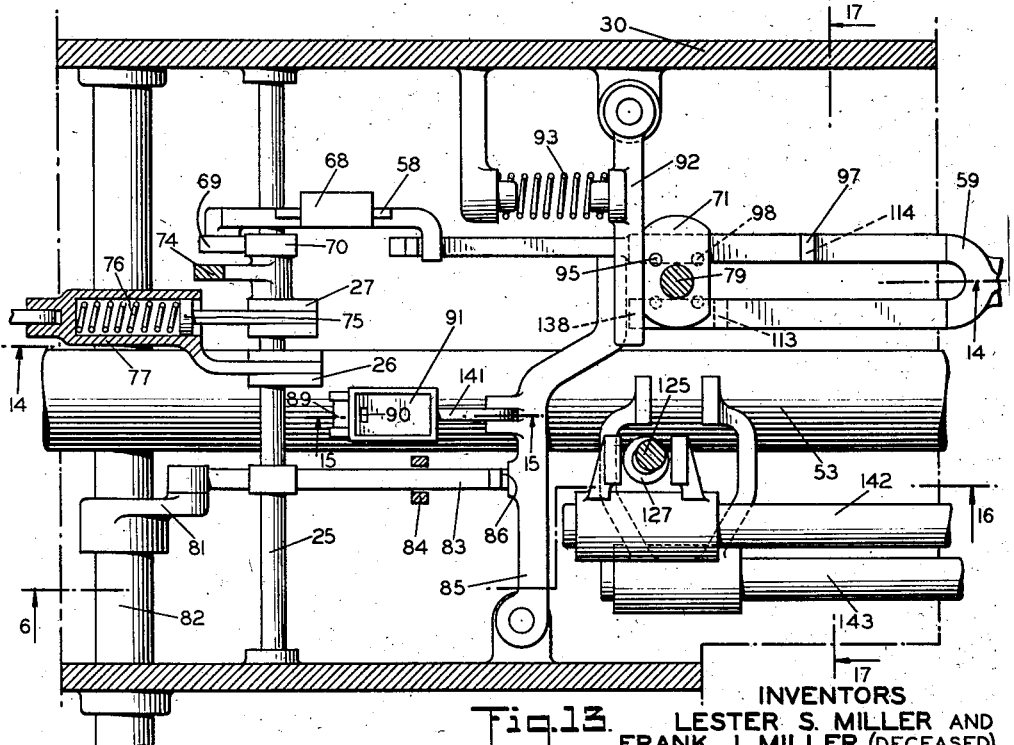
Figure 13 is a plan section of the front end of the gear box shown in Figure 1, with the top removed, taken along line 13—13 of Figure 17.

The front end of the timer thrust rod 59 is forked as shown in Figure 13, to pass on both sides of a vertical cam shaft 79. These forks have depending lugs 113 and 114 respectively, which cooperate with upstanding pins 111 and 115 on a timer trip 73 (Figs. 3, 5, and 26) rotatable on shaft 79 below the forks.

Trip 73 has a depending pin 107 operating in a slot 108 in a clutch cam 72 (Fig. 19) keyed to the shaft 79. Also keyed to this shaft is a longitudinal cam 103 (Fig. 18) having lobes 105 and 106 which operate in a slot 104 in a shifter plate 99.

One of the forks 59 also carries an upstanding lug 97, which cooperates with a depending pin 98 on a trip 71 (Figs. 2, 4, and 13) rotatable on the shaft 79 above the fork. A pin 95 on the upper side of trip 71 operates in a slot 96 in a lateral cam 94 (Fig. 22) rotatable on the shaft 79 and operating between rails 102 and 112 depending from shift plate 99. The cam 94 has a lobe 101 engageable with the rail 102, and a lobe 100 engageable with the rail 112.

As shown in Figures 13 and 14, a bar 92 pivoted on the gear casing wall is urged by a spring 93 against the flat side of trip 71. Similarly, a bar 109 therebelow is urged by a spring 110 against the flat side of trip 73. The clutch cam 72 operates a bar 85 pivoted on the gear casing 30. This bar 85 carries a lug 87 (Fig. 16) which abuts a lug 86 on one end of a link 83 sliding through a throw-off bar 84. The other end of link 83 is pivoted to an arm 81 on the clutch shaft 82. This bar 85 also has pivoted thereto a connecting rod 141 for a piston 140 operating in an oil cylinder 88 mounted in the casing 30. As shown in Figure 15, this cylinder has a hinged head or flap 89, and is provided with a bleed orifice 90 opening into an overflow pan 91.

The link 83, as shown in Figure 16, has a lug 78 engaging a lug 80 on a shaft 25. This shaft has an arm 26 (Fig. 13) pivoted to an offset extension of a cylinder 77, which in turn is connected by usual linkage to the carburetor throttle valve. Slidable in the cylinder 77 against a spring 76 is a piston 75 (Fig. 13) which is pivoted to an arm 27 rigid with the hub of the accelerator pedal arm 74, which is pivoted on the shaft 25. Also rigid with the hub of these arms is a cam 70 (Fig. 14) engaging a roller 69 on a hook 68 mounted in a guide 58 on the wall of the gear casing 30.

As shown in Figure 16, the shifter plate 99 has an opening 128 which receives a sleeve 119. This sleeve 119 has ears 120 which carry pins 124 received in slots formed in a forked end of a lever 122. An intermediate ball 121 on the gear lever 125 fits in the sleeve 119. The other end of the lever 122 is pivoted at 123 to the throw-off bar 84. The gear lever 125 has its main pivot at the ball 126, and the lower rounded end 127 is adapted to selectively enter the jaws of the sliding gear rods 142 and 143 (Fig. 13).

The upper end of the gear lever 125 is terminated at 129, and adapted to enter a socket 130 secured to the lower end of a gear lever extension 131. This extension 131 slides in a sleeve 132 having a spherical flange received in a guide 133. A spring 134 on the extension 131 is interposed between the sleeve 132 and a collar 135 secured to the extension 131. A latch 136 pivoted on the collar 135 is adapted to engage an annular flange 137 on the sleeve 132.

In operation, it will be assumed that the vehicle is in high gear. With the standard manual gear shift arrangement, this would require the operating knob of the shift lever to be to the right rear. But as the shift plate 99 is below the pivot 126 of the shift lever 125, this requires the shift plate 99 to lie to the left front. Hence to go from high to second, plate 99 must move the left rear, requiring merely a rearward movement of the plate 99.

When, for any reason the load increases, for example when the vehicle encounters an upgrade, as soon as the load is sufficient to overcome the springs 33, the incline 40 exerts a pressure on the incline 36. As the load increases sufficient to overcome the friction between these inclines and the resistance of spring 39, the member 37 is cammed forward by the inclines. This forward movement is transmitted by the yoke 45 to the thrust rod 56, and thereby to the fork end 59.

Forward movement of the end 59 causes the lug 113 on the under side of the fork, to engage pin 111 which extends upward from trip 73 therebelow, as shown in Figures 20 and 21. Thus this movement causes pin 111 and trip 73 to move a quarter turn. This causes the peak of trip 73 to move bar 109, compressing spring 110. During this quarter turn, pin 107 on the lower side of trip 73, idles along slot 108 in the clutch cam 72 therebelow. (Fig. 19.)

The spring 110 returns bar 109, turning trip 73 another quarter turn. Pin 107, now at the end of slot 108, turns clutch cam 72 also. Looking at Figure 19, this quarter turn causes the center peak of clutch cam 72 to move the clutch bar 85 forward.

As shown in Figures 13, 14, and 15, forward movement of the bar 85, through lugs 86 and 87, moves the arm 83 forward, which declutches the engine. The same forward movement, through lugs 78 and 80, turns the shaft 25 and its arm 76, which through the cylinder 77, closes the throttle.

At the same time, as cams 72 and 103 are keyed to the same shaft, cam 103 is moved this quarter turn, and peak 106 thereof engaging surface 104, moves shifting plate 99 to the rear, changing the gears from high to second.

The latter half of this second quarter turn moves the center peak of cam 72 (Fig. 19) past the bar 85, which reclutches the engine and releases the throttle. The vehicle now proceeds in second gear, the collar 37 remaining half open, and fork 59 remaining half advanced. Thus the transmission remains in second gear so long as this ratio is required.

When the grade or load is too great for second gear, the collar 37 again moves forward or open, further advancing the fork 59, to shift the gears from second to low. For manual shift a movement to the left rear would be required, hence the shift plate must now move to the right as well as forward.

The required forward movement of the shift plate is accomplished by a reverse movement of the cam 73, while the lateral movement is imparted by a further mechanism operated by trip 71. These movements are initiated by lugs 114 and 97. The lug 114 on the under side of the fork, upon forward movement of the end 59, engages the pin 115 which extends up from the trip 73 therebelow.

This reverses the half turn described to shift from high to second, as follows: The peak of trip 73 moves bar 109 and compresses spring 110, pin 107 idling reversely along slot 108. Spring 110 returns bar 109, turning trip 73 the remainder of the half turn. Meantime pin 107 at the other end of slot 108 turns clutch cam 72, to open and close the clutch. Cam 103 being keyed to the shaft of cam 72, causes the peak 105 thereof to engage surface 104 and shift plate 99 forward.

While the lug 114 has been thus functioning, another series of movements has been taking place. The same movement of fork 59 which moved lug 114 also caused the lug 97 on the upper side of fork 59 to engage the pin 98 on the lower side of trip 71, (Fig. 28), and move the trip 71 a quarter turn, camming the bar 92, and compressing spring 93 (Fig. 14). For this quarter turn pin 95 on the other side of trip 71 has merely idled along the slot 96 in cam 94 (Fig. 22).

The spring 93 returns bar 92, which turns trip 71 another quarter turn to the position shown in Figure 26, and pin 95 now at the end of slot 96 in cam 94, turns it also. This causes peak 100 of cam 94 to engage the rail 102 and move the shifting plate 99 laterally. Looking at Figure 16, lateral movement of plate 99, with the sleeve 119 in the opening 128 of the plate, causes lateral movement of ball 121 about ball 126 as a pivot, thus moving ball 127 rearward, which shifts the gears from second to low.

The parts remain in this position as long as low gear operation is required. At this time the fork 59 is in its extreme forward position and the collar 37 is in full open position.

This completes the shifting down or gear ratio increasing action of the automatic gear shift. The stepping up or gear ratio reducing action necessary when the torque is reduced, is accomplished by a substantially reverse action of the same mechanism.

It should be recalled that during the forward movement of the fork 59, the lug 113 passed by its pin 111 on the trip 73, for the shift from high to second, and the lug 114 passed by its pin 115 for the shift from second to low, and in so doing, returned the pin 111 to its original position.

Hence when the load decreases, the spring 39 moves the collar 37 toward closed position, which permits spring 67 to move the fork 59 rearward. Lug 114 engages pin 116 and turns the trip 73. This operates clutch cam 72 to declutch and throttle, and also operates cam 103, peak 106 thereof moving the shift plate rearward.

Meantime lug 97 engages pin 117 which turns trip 71 and cam 94, of which the peak 101 now engages rail 112 for the reverse lateral movement, completing the shift from low to second.

Further return movement of fork 59 causes lug 113 to engage pin 118 and turn the trip 73 operating the clutch and throttle, and the peak 105 of cam 103 engages the surface 104 and moves the shift plate 99 forward, completing the shift from second to high.

From the above description of the operation, it is apparent that the longitudinal gear shifting movements are controlled by a snap action device (comprising trip 73, bar 109, and spring 110) which through the lost motion device (107, 108) actuates a snap action device (cam 72, bar 85, and the conventional clutch spring) for operating the clutch (and throttle). The snap action device (73 etc.) is combined with a snap action device (trip 71, bar 92, and spring 93) for lateral shifts.

If while the vehicle is operating in high gear, the operator releases or pulls back the accelerator pedal 74, the spring 67 and/or 76 forces this pedal to its rearmost position. The cam 70 on the hub of this pedal also moves back, which permits the roller 69 and hook 68 to move back. This permits movement of the rod 59 to the rear, caused by the spring 67, the spring 60 being compressed to permit this.

This movement causes lug 138 on the fork 59 to engage pin 115 on the trip 73 which gives the trip 73 a reverse movement of less than 45°. The pin 107 is in the opposite end of the slot 108 so that there is no lost motion in reverse. Hence the cam 72 is turned almost 45°, which is sufficient to cause its peak 139 to cam bar 85 forward to declutch the service clutch, resulting automatically in free wheeling, or coasting operation, whenever the transmission is in high gear and the gas pedal is released or pulled back.

However, as soon as the operator steps on the accelerator pedal, the cam 70 thereon engages the roller 69 on the hook 68, which engages the hook extension of arm 59 and pulls it forward enough to reverse or prevent this arm from drifting back and thus prevents the free wheeling operation just described.

If the operator should push the accelerator pedal 74 while a shift is being made, the lugs 78 and 80 would prevent turning of the shaft 25, and then prevent opening of the throttle, but the pedal 74 being loose on shaft 25 would be depressed, and merely compress the spring 76 without moving the cylinder 77.

Whenever it is necessary to use the reverse gear, or whenever manual shifting of the forward speeds is desired, the operator pushes down on the extension 131, causing the latch 136 to engage the flange 137, and the socket 130 to engage the end 129. At the same time the throw-off bar 84 is forced downward, causing the lever 122 to lift the sleeve 119 clear of the ball 121 and the opening 128. The throw-off bar also pushes the bar 83 downward causing the lug 86 to clear the lug 87. This downward movement of bar 83 also causes lug 78 thereon to clear lug 80 on the shaft 25.

Hence all automatic control or action is disconnected, leaving the throttle, clutch, and gear shift free for manual control. When automatic control is again desired, the operator releases the latch 136, and the spring 134 automatically arranges the parts of the automatic action.

When the engine power decreases, for example, due to need of overhaul, the timing of the automatic action may be adjusted thereto, by the operator pushing down the rod 54. This lowers the rod 51 and the arm 50, thus turning the screw 49 and advancing the timing of the automatic shifting. When the engine power is restored, as after overhaul, the rod 54 may be pulled up to advance the timing to adjust the same to the increased power.

It should be noted that temporary torque impulses, such for example as those occasioned by the vehicle passing over bumps or depressions in the road, will not cause shifting of gears. Such shocks are absorbed by the spring 60. However, less temporary increases of load, continuing for sufficient duration of time to permit the plunger 61 to advance against the dash pot action of the orifice 63, will cause the first shift from high to second.

Also, the clutch action is cushioned by the dash pot effect of the orifice 90, but this does not prevent rapid declutching, which is permitted by the flap cylinder end 89.

Furthermore, the actual shifting force is supplied by the springs 93 and 110 so that the actual shifting movement is always smooth and constant, not being dependent upon a variable force. For example, whether the advance of the fork 59 is fast or slow, the speed of the actual gear movement is always the same.

The invention embraces such embodiments of the broad idea as fall within the scope of the appended claims.

What is claimed is:

1. Automatic gear shift comprising in combination, a transmission gear box having an H-movement for shifting, and torque responsive means for shifting gears in said gear box.

2. In a motor vehicle, in combination, an internal combustion engine, a transmission gear box driven thereby and requiring both longitudinal and lateral movement for shifting, a drive shaft driven by said gear box by which traction is applied for propelling the vehicle, and means interposed in said drive shaft and responsive to the torque thereof for shifting the gears in said gear box.

3. In a motor vehicle having an internal combustion engine provided with a throttle and a clutch and a transmission gear box having a lever movable in one direction for one forward speed, and in the opposite direction for another forward speed, automatic means for controlling said throttle and clutch and operating said lever for shifting gears in said transmission gear box.

4. Automatic gear shift comprising in combination, a thrust member, torque responsive means for actuating said thrust member, a gear shift lever, means responsive to initial movement of said thrust member for moving said lever in one direction, means responsive to further movement of said thrust member for moving said lever in the opposite direction and simultaneously moving it laterally, and means responsive to still further movement of said thrust member for moving said lever in the first direction.

5. In an automatic gear shift, a transmission box, a thrust member, means responsive to torque for thrusting said member, a cam, cooperating means on said member and cam for giving said cam initial movement in response to initial movement of said member, spring means compressed by said initial movement cooperating with said cam for giving it further movement, and means actuated by said further movement of said cam for shifting gears in said transmission box.

6. In an automatic gear shift, an actuator responsive to torque, a snap action device engaged by said actuator, and gear shifting mechanism operated by the snap action.

7. In an automatic gear shift, an actuator responsive to torque, a snap action device engaged by said actuator, gear shifting mechanism operated by the snap action, and a dash pot in opposition to said snap action device.

8. In an automatic gear shift, an actuator responsive to torque, a cam, a spring pressed member engaging said cam, said cam having a dead center past which it is moved by said actuator, and gear shifting mechanism operated by said cam driven by said spring.

9. In an automatic gear shift, a cam shaft, a clutch operating cam on said shaft, a gear shift operating cam on said shaft, spring means for turning said shaft, and an actuator for compressing said spring and setting the same for operating said shaft.

10. In a motor vehicle, a transmission gear box, a stug gear lever therein, a shifter plate having an aperture receiving said lever, cams engaging said plate, and automatic means for operating one of said cams for longitudinal movement and another of said cams for lateral movement.

11. In a motor vehicle having a transmission gear box and torque responsive means for automatically shifting gear therein according to an H-movement, manual means for rendering said automatic means inoperative and thereby simultaneously connecting said gear box for manual shifting.

12. In a motor vehicle having a transmission gear box having opposite movements for two forward speeds and torque responsive means for automatically shifting gears therein, operating the clutch and controlling the throttle, manual means for rendering said automatic means inoperative and thereby simultaneously connecting said gears, clutch and throttle for manual operation.

13. In a motor vehicle having a transmission gear box and a stub gear lever therein, automatic means for operating said lever to shift the gears, an extension gear lever and means for automatically disconnecting said automatic means when said extension lever is engaged with said stub lever.

14. In a motor vehicle, a transmission gear box, a stub lever for shifting gears therein, a shifter plate having an aperture receiving said lever, cams engaging said plate, means for operating one of said cams for longitudinal movement and another thereof for lateral movement, automatic torque responsive means for actuating said means, a gear lever extension, and means for simultaneously disconnecting said plate and connecting said extension, to adapt the device for manual shifting.

15. In a motor vehicle having a transmission gear box and a drive shaft in two sections, means interposed in said drive shaft for causing a longitudinal movement responsive to torque therein, comprising complementary members on the adjacent ends of said drive shaft sections, spring means holding said members in circumferential contact, and cams on said members for spreading the same when the torque overcomes said spring means, and means connected to one of said complementary members and to said gear box for automatically shifting the gears therein.

16. In a motor vehicle having a transmission gear box, a clutch and a throttle, torque responsive means for automatically operating said clutch, throttle and gears to make a shift, and means actuated by reverse movement of said automatic means for declutching and closing said throttle, for coasting in high gear.

17. In a motor vehicle having a transmission gear box and a clutch, a thrust member, torque responsive means for actuating said thrust member, means operated by successive movements of said thrust member for operating said clutch and shifting said gears, and means for operating said thrust member for declutching for coasting in high gear.

18. Automatic gear shift comprising in combination, a transmission gear box, automatic means for shifting gears in said box, and means for adjusting said automatic means to compensate for loss of power.

19. Automatic gear shift comprising in combination, a transmission gear box having an H-arrangement for gear shifting including movements in opposite directions for two forward speeds and a lateral movement therebetween, automatic means for shifting gears in said box in response to torque, and yieldable means for rendering said means unresponsive to momentary variations in torque irrespective of speed.

20. In a motor vehicle having a transmission gear box, and a drive shaft in two sections, a collar on one of said sections, means actuated by relative rotation of said sections for sliding said collar, a pivoted lever engaging said collar, a thrust rod actuated by said lever, and means for adjusting the length of said thrust rod connected to said lever to compensate for variation in power.

21. In an automatic gear shift, in combination, a thrust member, torque responsive means for actuating said thrust member, a gear shift lever, means responsive to initial movement of said thrust member for moving said lever in one direction, and means responsive to further movement of said thrust member for moving said lever in the opposite direction.

22. In an automatic gear shift, in combination, a thrust member, torque responsive means for actuating said thrust member, a gear shift lever, means responsive to initial movement of said thrust member for moving said lever in one direction, and means responsive to further movement of said thrust member for moving said lever in the opposite direction and simultaneously moving it laterally.

23. In an automatic gear shift, in combination, a thrust member, torque responsive means for actuating said thrust member, a gear shift lever, means responsive to initial movement of said thrust member for moving said lever in one direction, and means responsive to further movement of said thrust member for moving said lever laterally with respect to the first direction.

24. In a motor vehicle having an internal combustion engine, a transmission box and a clutch, automatic means for shifting gears in said transmission box, and a snap action device actuated thereby for operating said clutch.

25. In an automatic gear shift, an actuator, a snap action device engaged by said actuator for controlling longitudinal gear shifting movement, in combination with another snap action device for controlling lateral gear shifting movement.

LESTER S. MILLER,
Pro se.
LESTER S. MILLER,
Administrator of Frank J. Miller, Deceased.

CERTIFICATE OF CORRECTION.

Patent No. 2,062,523.   December 1, 1936.

LESTER S. MILLER, ET AL.

It is hereby certified that error appears in the printed specification of the above numbered patent requiring correction as follows: page 3, second column, line 72, for the word "of" read for; page 4, second column, line 25, claim 10, for "stug" read stub; line 33, claim 11, for "gear" read gears; and that the said Letters Patent should be read with these corrections therein that the same may conform to the record of the case in the Patent Office.   Signed and sealed this 23rd day of February, A. D. 1937.

(Seal)

Henry Van Arsdale
Acting Commissioner of Patents.